(12) United States Patent
Smith (10) Patent No.: US 11,464,219 B1
(45) Date of Patent: Oct. 11, 2022

(54) CENTER OF BALANCE LOCATING APPARATUS AND METHOD

(71) Applicant: Ross Smith, Moose Jaw (CA)

(72) Inventor: Ross Smith, Moose Jaw (CA)

(*) Notice: Subject to any disclaimer, the term of this patent is extended or adjusted under 35 U.S.C. 154(b) by 0 days.

(21) Appl. No.: 17/356,433

(22) Filed: Jun. 23, 2021

(51) Int. Cl.
*A01L 11/00* (2006.01)

(52) U.S. Cl.
CPC ..................... *A01L 11/00* (2013.01)

(58) Field of Classification Search
CPC ............................. A01L 11/00; A01K 15/04
USPC ............................................................ 168/45
See application file for complete search history.

(56) References Cited

U.S. PATENT DOCUMENTS

| | | | | |
|---|---|---|---|---|
| 73,901 A * | 1/1868 | Johnson | ................... | A01L 11/00 451/346 |
| 283,503 A * | 8/1883 | McCollum | ............. | A01K 15/04 168/19 |
| 562,526 A * | 6/1896 | Grogan et al. | .......... | A01L 11/00 168/48.1 |
| 583,706 A * | 6/1897 | Kearns et al. | .......... | A01L 11/00 33/195 |
| 602,952 A * | 4/1898 | Millett | ..................... | A01L 11/00 33/195 |
| 783,094 A * | 2/1905 | Blakeslee et al. | ...... | A01L 11/00 33/195 |
| 832,060 A * | 10/1906 | Holmquist | .............. | A01L 11/00 33/195 |
| 893,592 A * | 7/1908 | McGowen | .............. | A01L 11/00 168/48.1 |
| 4,214,370 A * | 7/1980 | Beaston | .................. | A01L 11/00 168/45 |
| 4,813,148 A * | 3/1989 | Finnegan | ................ | A01L 11/00 33/195 |
| 5,027,520 A * | 7/1991 | Finnegan | ................ | A01L 11/00 33/511 |
| 6,907,670 B1 * | 6/2005 | Teed | ........................ | A01L 11/00 33/511 |
| 7,165,623 B2 * | 1/2007 | Healey | .................... | A01L 11/00 168/45 |
| 2019/0350183 A1 * | 11/2019 | Lewis | ...................... | A01L 15/00 |

FOREIGN PATENT DOCUMENTS

DE          102008025364 A1 * 12/2009  ............... A01L 11/00

OTHER PUBLICATIONS

P. K. Kawareti et al., "Morphometrical Studies on Hooves in Horses (*Equus caballus*) in Different Age Groups," International Journal of Livestock Research, vol. 7(11), 184-190 (Year: 2017).*
Stephen E. O'Grady, "Guidelines for Trimming the Equine Foot: A Review," AAEP Proceedings, vol. 55, 218-225 (Year: 2009).*

* cited by examiner

*Primary Examiner* — Lisa L Tsang
(74) *Attorney, Agent, or Firm* — Capehart Law Firm (57) ABSTRACT

An apparatus for use in finding a center of balance of a hoof a horse, and methods for using the apparatus for fitting a shoe for the hoof based on the center of balance. The apparatus includes a body, an elongated member, and an attachment means for removably attaching the apparatus to the hoof. The apparatus is useful for finding the center of balance in a horse's hoof and that information may then be used by a farrier to trim and shoe the hoof in balance with each horse's individual center of balance.

7 Claims, 8 Drawing Sheets

CENTER OF BALANCE LOCATING APPARATUS AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of animal care accessories of existing art and more specifically relates to an apparatus and method for aiding in the trimming and shoeing of horses' hooves.

RELATED ART

The fitting of horseshoes is a professional occupation conducted by a professional craftsman known as a farrier. A farrier specializes in the preparation of feet, assessing potential lameness issues, and fitting appropriate shoes. The shoeing of horses is a specialized task as errors in shoeing can lead to damage to the horse's leg and foot. For example, unnecessary strain placed on bones, tendons, ligaments, etc. in the hoof may cause lameness. Due to the importance of correctly shoeing horses, it is often a difficult task. For example, trimming and shoeing regularly requires a veterinarian to first perform an x-ray of the hooves. This is a problem as it is often challenging to get a veterinarian to visit the horse to x-ray every hoof, and if the owner is able to obtain a veterinarian, it is not financially feasible. Thus, a suitable solution is desired.

SUMMARY OF THE INVENTION

In view of the foregoing disadvantages inherent in the known shoeing device art, the present disclosure provides a novel center of balance locating apparatus and method. The general purpose of the present disclosure, which will be described subsequently in greater detail, is to provide an apparatus for use in finding a center of balance of a hoof of a horse and for providing a means of indicating the center of balance for use in trimming and shoeing the hoof.

An apparatus is disclosed herein. The apparatus includes a body being defined by a peripheral plate framing an opening. The body may include a top body side opposite a bottom body side, a left body side opposite a right body side and a front body side opposite a rear body side all being relative to the horse when the apparatus is attached to the hoof. The top body side may be configured to contact a hoof wall of the hoof. The peripheral plate may include an inner perimeter, an outer perimeter, and a flat profile such that the body lies substantially flat against the hoof wall when attached thereto.

An elongated member may be attached to the bottom body side of the body at a mid-section thereof. The elongated member may include a front member side opposite a rear member side, a left member side opposite a right member side and a length therebetween. The length may span horizontally from the left body side to the right body side and over the opening. The front member side and the front body side at the inner perimeter may define a first distance therebetween and the rear member side and the rear body side at the inner perimeter may define a second distance therebetween. The elongated member may protrude from the bottom side of the body and contact a ground surface when the apparatus is attached to the hoof, thus elevating the hoof off of the ground surface. Further, an attachment means (attacher) may be located on the apparatus and may be configured to attach the apparatus to the hoof.

According to another embodiment, a method of finding and indicating a center of balance of a hoof of a horse for use in fitting a shoe for the hoof is also disclosed herein. The method includes providing the apparatus as above; attaching the apparatus to the hoof wall of the hoof via the attachment means; placing the hoof down on (adjacent) the ground surface, allowing the horse to stand using the hoof; finding the center of balance of the hoof by: monitoring alignment of the hoof and balance of the horse; and adjusting positioning of the apparatus based on monitored alignment and balance until the monitored alignment and balance is correct; indicating the center of balance by at least: making a first mark on a bottom of the hoof underneath the elongated member; and making a second mark on the bottom of the hoof at the front body side against the inner perimeter of the body; and removing the apparatus from the hoof wall of the hoof via the attachment means.

According to another embodiment, a method of finding and indicating a center of balance of a hoof of a horse and fitting a shoe for the hoof based on the center of balance is also disclosed herein. The method includes providing the apparatus as above; attaching the apparatus to the hoof wall of the hoof via the attachment means; placing the hoof down on (adjacent) the ground surface, allowing the horse to stand using the hoof; finding the center of balance of the hoof by: monitoring alignment of the hoof and balance of the horse; and adjusting positioning of the apparatus based on monitored alignment and balance until the monitored alignment and balance is correct; indicating the center of balance by at least: making at least a first mark on the bottom of the hoof underneath the elongated member; and making at least a second mark on the bottom of the hoof at the front body side against the inner perimeter of the body; removing the apparatus from the hoof wall of the hoof via the attachment means; and fitting the horseshoe for the hoof by at least: placing a front of a horseshoe toe section against the second mark; and attaching the horseshoe to the hoof wall of the hoof.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a center of balance locating apparatus and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to shoeing device art and more particularly to a center of balance locating apparatus and method as used to improve the trimming and shoeing of horse hooves. Generally disclosed is a device used to find the center of balance in a horse's hoof. That information may then be used by a farrier to trim and shoe the hoof in balance with each horse's individual center of balance. Once the center of balance is found, the farrier has a point of reference that is repeatable each time they shoe the horse. When shoed with center of balance correct, the horse can stand the way it was naturally intended, allowing the horse to grow a healthier and stronger hoof. Preferably, the device may be compact enough to fit into a farrier's toolbox.

Referring now more specifically to the drawings by numerals of reference, there is shown in FIGS. 1-9C, various views of an apparatus 100.

Figure 1:
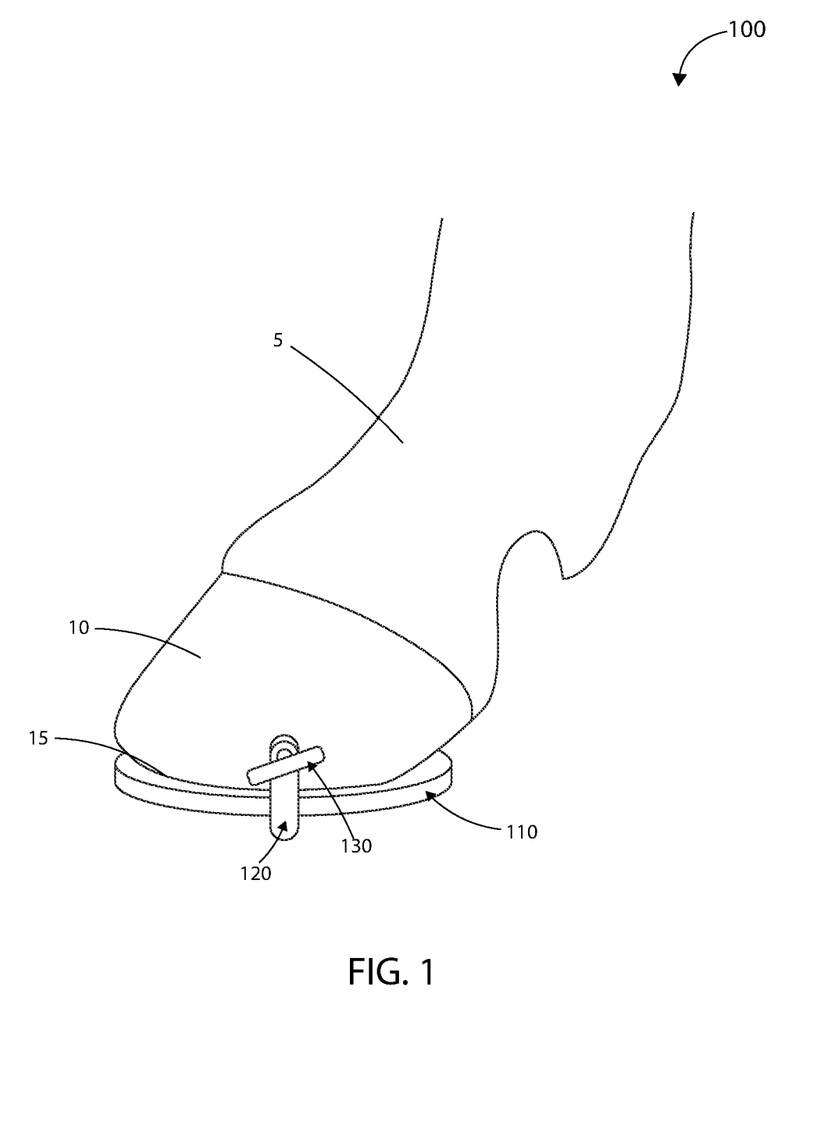
FIG. 1 is a perspective view of an apparatus during an 'in-use' condition, according to an embodiment of the disclosure.

FIG. 1 shows the apparatus 100 during an 'in-use' condition, according to an embodiment of the present disclosure. As above, the apparatus 100 may be used for finding a center of balance of a hoof 10 of a horse 5. As shown in FIG. 1, the apparatus 100 may be configured for (removable) attachment to a hoof wall 15 of the hoof 10. The apparatus 100 may include a body 110, an elongated member 120, and an attachment means 130 (attacher).

The body 110 may be defined by a peripheral plate 111 framing an opening 112. The peripheral plate 111 may include an inner perimeter 1101, an outer perimeter 1102 and a flat profile such that the body lies substantially flat against the hoof wall 15 of the hoof 10 when attached thereto. As shown specifically in FIGS. 2, 4 and 7, the peripheral plate 111 may include a substantially ring shape configured to conform to a general shape of the hoof wall 15 of the hoof 10. In this embodiment, the inner perimeter 1101 may be an inner circumference of the ring shape and the outer perimeter 1102 may be an outer circumference of the ring shape.

Further, a total diameter of the body 110 (as measured from the outer circumference of the peripheral plate 111) may be equal to, or at least similar to, a total diameter of a bottom 20 of the hoof 10. In addition, the peripheral plate 111 may be made from a durable material for withstanding a weight of the horse 5. For example, the peripheral plate 111 may be made from a metal material, such as steel. However, it should be appreciated that the peripheral plate 111 is not limited to metal material.

Figure 2:
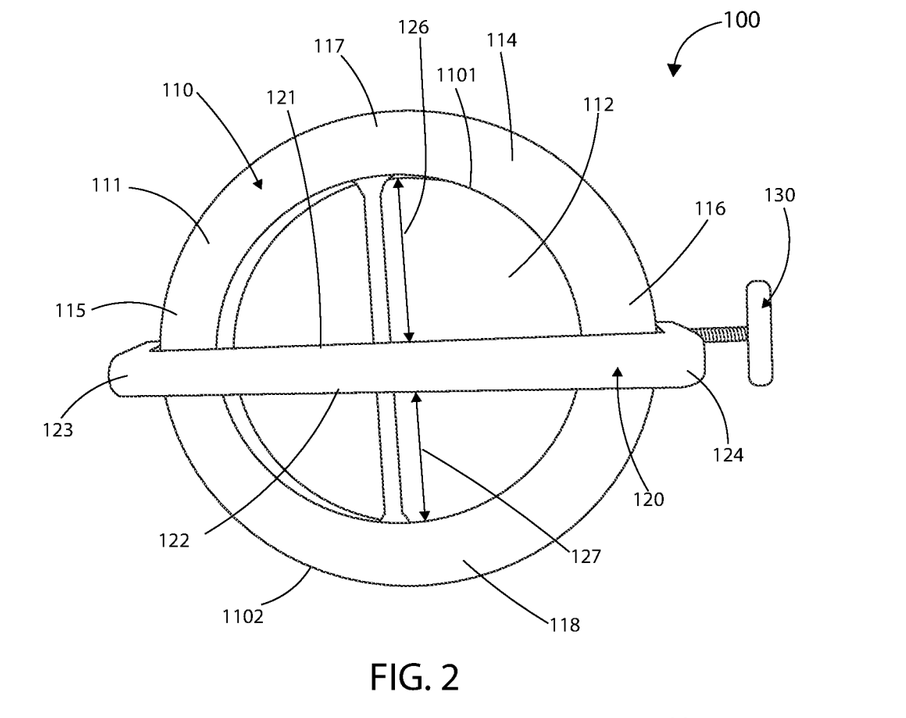
FIG. 2 is a bottom perspective view of the apparatus, according to an embodiment of the present disclosure.

As shown in FIG. 2, the body 110 may include a top body side 113 (FIGS. 4-5) opposite a bottom body side 114, a left body side 115 opposite a right body side 116 and a front body side 117 opposite a rear body side 118, all being relative to the horse 5 when the apparatus 100 is attached to the hoof 10 (as shown in FIG. 1, the top body side 113 may be configured to contact the hoof wall 15 of the hoof 10). As shown in FIG. 2, the elongated member 120 may be attached to the bottom body side 114 of the body 110 at a mid-section thereof (or at least substantially the mid-section thereof).

As shown in FIG. 2, the elongated member 120 may include a front member side 121 opposite a rear member side 122, a left member side 123 opposite a right member side 124 and a length 125 therebetween. As shown, the length 125 may span horizontally from the left body side 115 to the right body side 116 and over the opening 112. Further, as shown specifically in FIGS. 1 and 5, the elongated member 120 may protrude from the bottom body side 114 of the body 110 and contact a ground surface when the apparatus 100 is attached to the hoof 10, thus elevating the hoof 10 off of the ground surface (yet adjacent) and causing an imbalance in a standing horse 5 (standing on the hoof 10 with the apparatus 100 attached) when not placed correctly.

Figure 5:
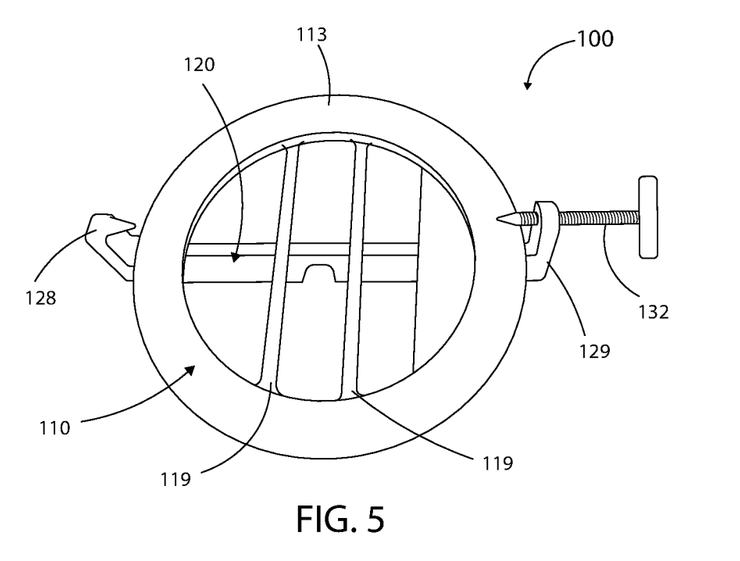
FIG. 5 is a top perspective view of the apparatus, according to another embodiment of the present disclosure.
Figure 6:
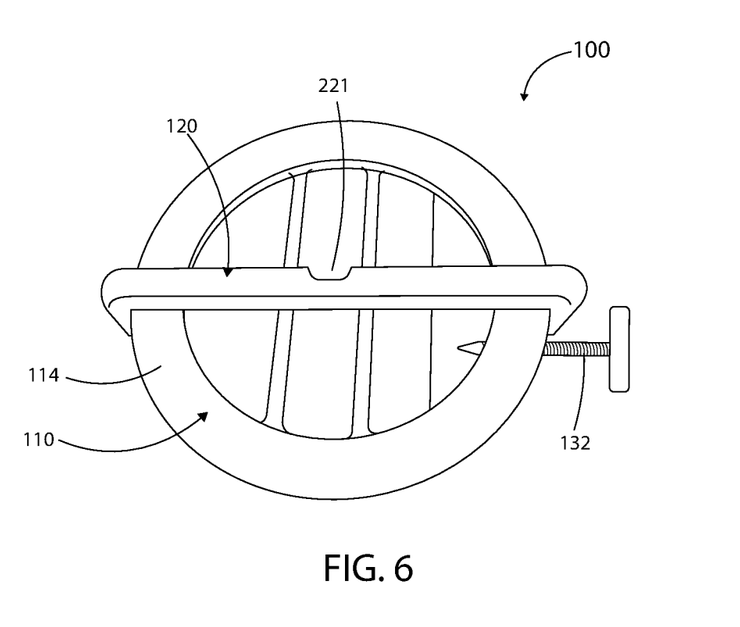
FIG. 6 is a bottom perspective view of the apparatus, according to another embodiment of the present disclosure.
Figure 7:
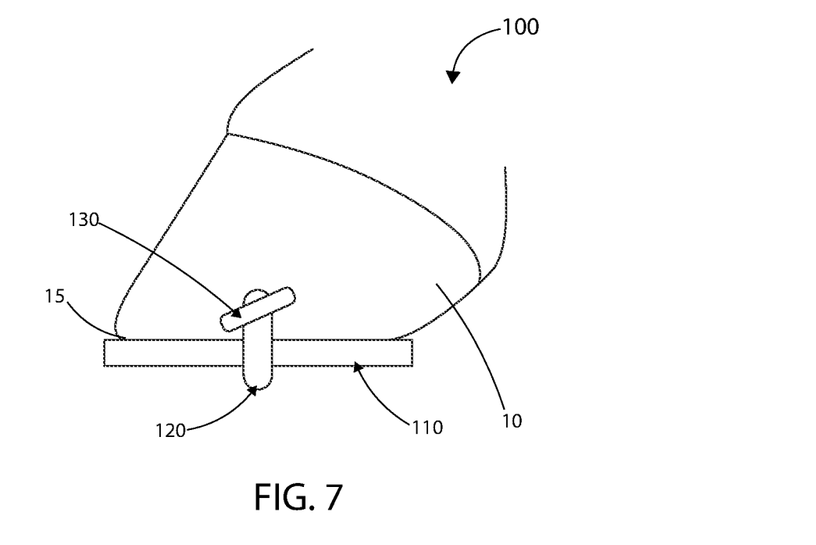
FIG. 7 is a side view of the apparatus, illustrating the apparatus being attached to a hoof wall of a hoof, according to an embodiment of the present disclosure.
Figure 8:
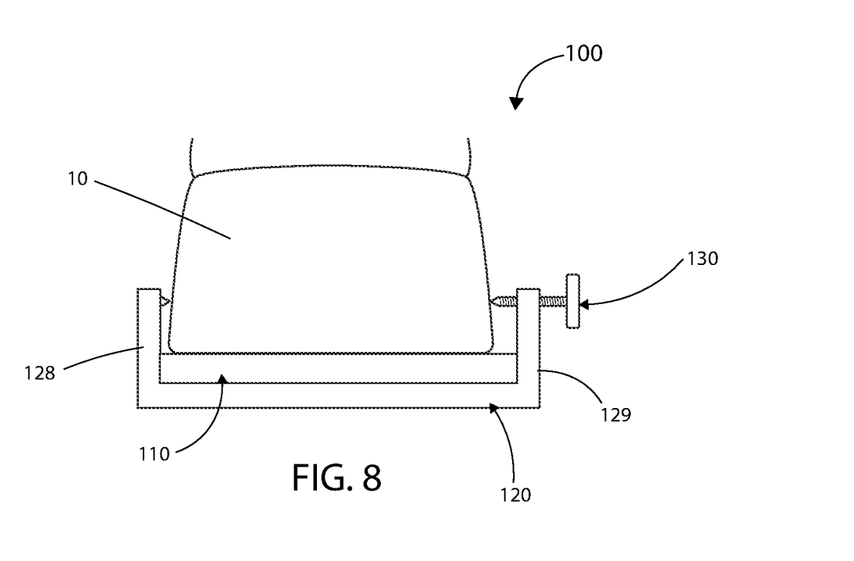
FIG. 8 is a rear view of the apparatus, illustrating the apparatus being attached to the hoof wall of the hoof, according to an embodiment of the present disclosure.

As such, when the standing horse 5 is balanced standing on the hoof 10 and the hoof 10 is straight, the elongated member 120 is thus in line with their center of balance. An owner is then able to visually note a position of the center of balance and mark the position on the hoof 10. As shown in FIGS. 5-6, in some embodiments, the elongated member 120 may include a notch 221 configured to allow the owner to easily mark the hoof 10 when balanced. The center of balance does not change, and therefore a farrier may have a point of reference that is repeatable each time they shoe the particular horse 5. Further, the point of reference may be communicated between the farrier and a veterinarian.

To aid in the imbalance, the elongated member 120 may be an elongated bar including a substantially cylindrical shape. It should be appreciated that many shapes and sizes may be contemplated. As shown in FIG. 2, the front member side 121 and the front body side 117 at the inner perimeter 1101 may define a first distance 126 therebetween, and the rear member side 122 and the rear body side 118 at the inner perimeter 1101 may define a second distance 127 therebetween. In some embodiments, the first distance 126 and the second distance 127 may be equal. Preferably, the first distance 126 may measure 2 inches.

Figure 4:
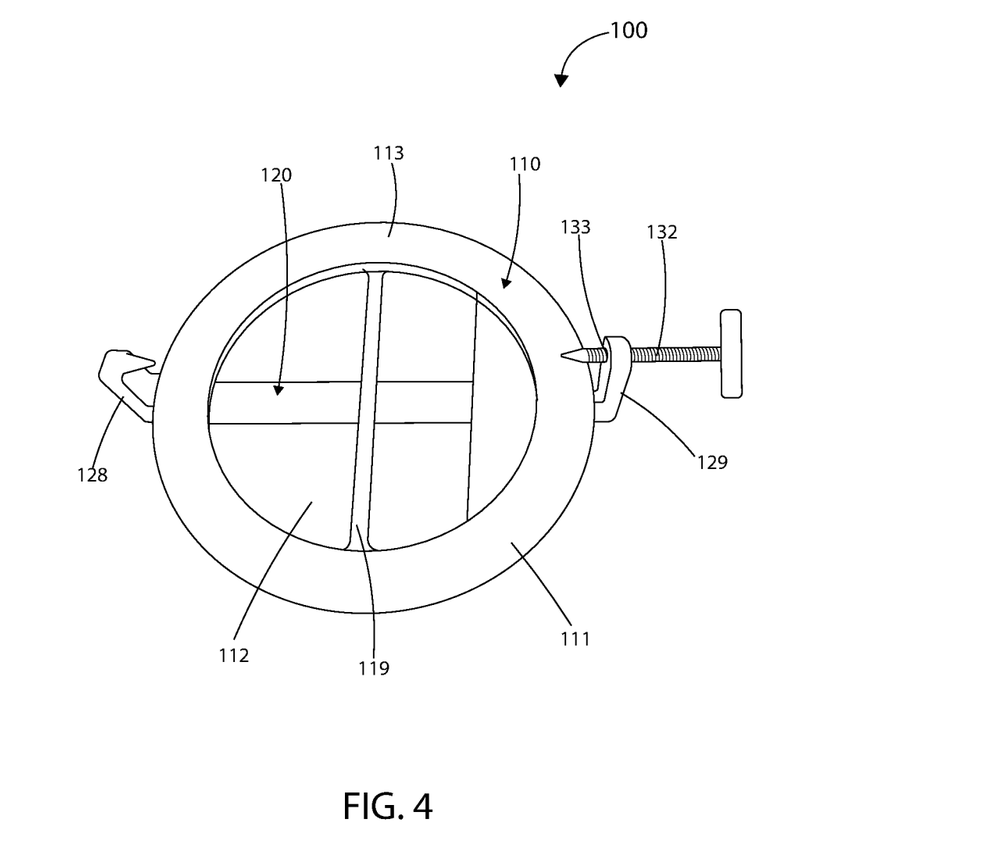
FIG. 4 is a top perspective view of the apparatus, according to an embodiment of the present disclosure.

Further, in some embodiments, as shown in FIGS. 2 and 4, the body may include at least one rod 119 attached to the bottom body side 114 of the body and intersecting the opening 112 at the mid-section thereof. Each end of the at least one rod 119 may be attached to (and terminate at) the inner perimeter 1101 of the peripheral plate 111 and span horizontally from the front body side 117 to the rear body side 118. As shown in FIGS. 5-6, in some embodiments, the body may include two rods 119.

Figure 3:
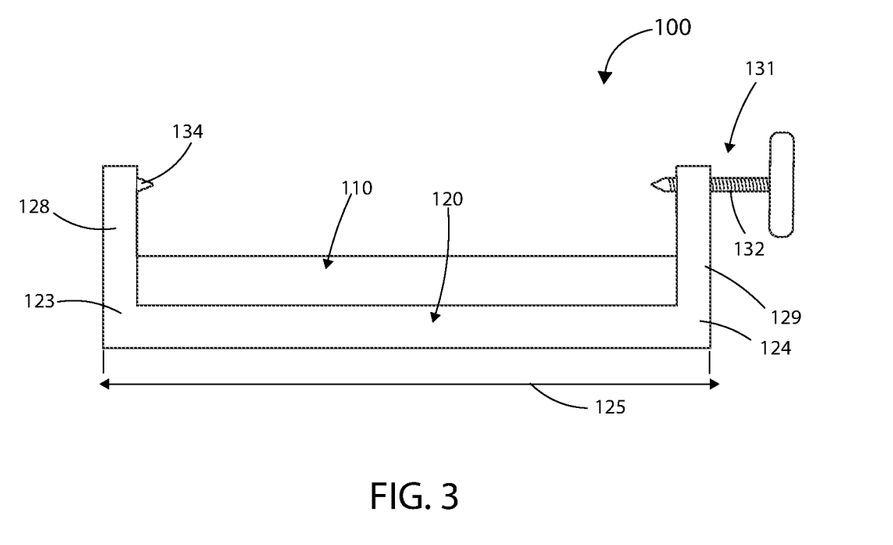
FIG. 3 is a front view of the apparatus, according to an embodiment of the present disclosure.

The attachment means 130 may be located on the apparatus 100 and configured to attach the apparatus 100 to the hoof 10. The attachment means 130 may include an adjustable clamp assembly 131. In some embodiments, the elongated member 120 may include a first vertical section 128 at the left member side 123 and a second vertical section 129 at the right member side 124. As shown in FIGS. 3 and 4, the adjustable clamp assembly 131 may include a threaded screw 132 and the second vertical section 129 may include a threaded aperture 133 for receiving the threaded screw 132. As such, the threaded screw 132 may be configured to be selectively threaded into the threaded aperture 133 to tighten the adjustable clamp assembly 131 against the hoof 10 and selectively threaded out of the threaded aperture 133 to loosen the adjustable clamp assembly 131 against the hoof 10. Other attachment means 130 may also be contemplated. Further, in some embodiments, as shown in FIG. 3, the first vertical section 128 may include a spike 134 to aid in holding the apparatus 100 on the hoof 15.

Figure 9B:
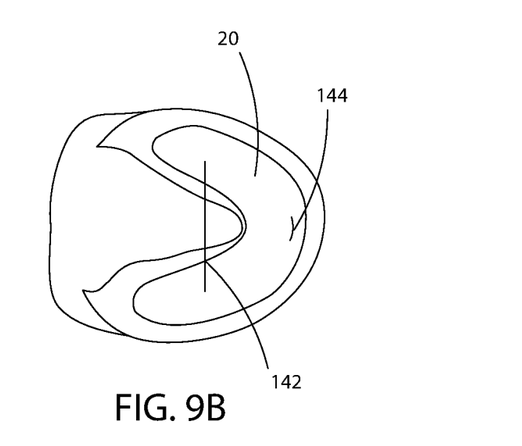
FIG. 9B is a bottom view illustrating marks on a bottom of the hoof, according to an embodiment of the present disclosure.
Figure 10:
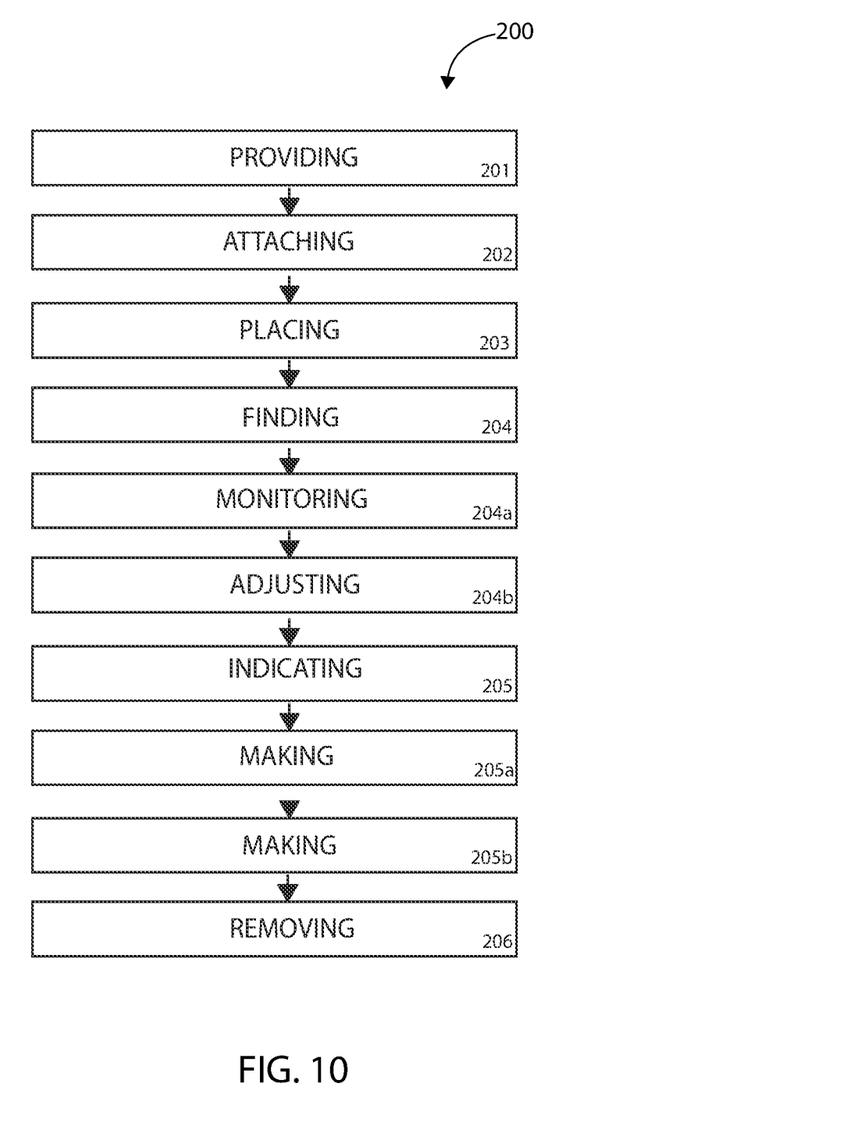
FIG. 10 is a flow diagram illustrating a method of finding and indicating a center of balance of a hoof of a horse for use in fitting a shoe for the hoof, according to an embodiment of the present disclosure.

Referring now to FIG. 10 showing a flow diagram illustrating a method 200 of finding and indicating a center of balance of a hoof of a horse for use in fitting a shoe for the hoof, according to an embodiment of the present disclosure. In particular, the method 200 may include one or more components or features of the apparatus 100 as described above. As illustrated, the method 200 may include the steps of: step one 201, providing the apparatus 100 as above; step two 202, attaching the apparatus 100 to the hoof wall 15 of the hoof 10 via the attachment means 130; step three 203, placing the hoof 10 down on the ground surface, allowing the horse 5 to stand using the hoof; step four 204, finding the center of balance of the hoof 10 by monitoring (204a) alignment of the hoof 10 and balance of the horse 5; and adjusting (204b) positioning of the apparatus 100 based on monitored alignment and balance until the monitored alignment and balance is correct; step five 205, indicating the center of balance by at least making (205a) a first mark 142 on a bottom 20 of the hoof 10 underneath the elongated member 120 (for example, as shown in FIG. 9B, the first mark 142 may be made partially across a sole and a frog section of the hoof 10); and making (205b) a second mark 144 on the bottom 20 of the hoof 10 at the front body side 117 against the inner perimeter 1101 of the body 110 (for example, again as shown in FIG. 9B, the second mark 144 may be made partially across a toe section of the hoof); and step six 206, removing the apparatus 100 from hoof wall 20 of the hoof 10 via the attachment means 130. In this embodiment, the markings may then be used by a farrier for trimming and shoeing the horse 5 or may be used for another purpose.

Figure 11:
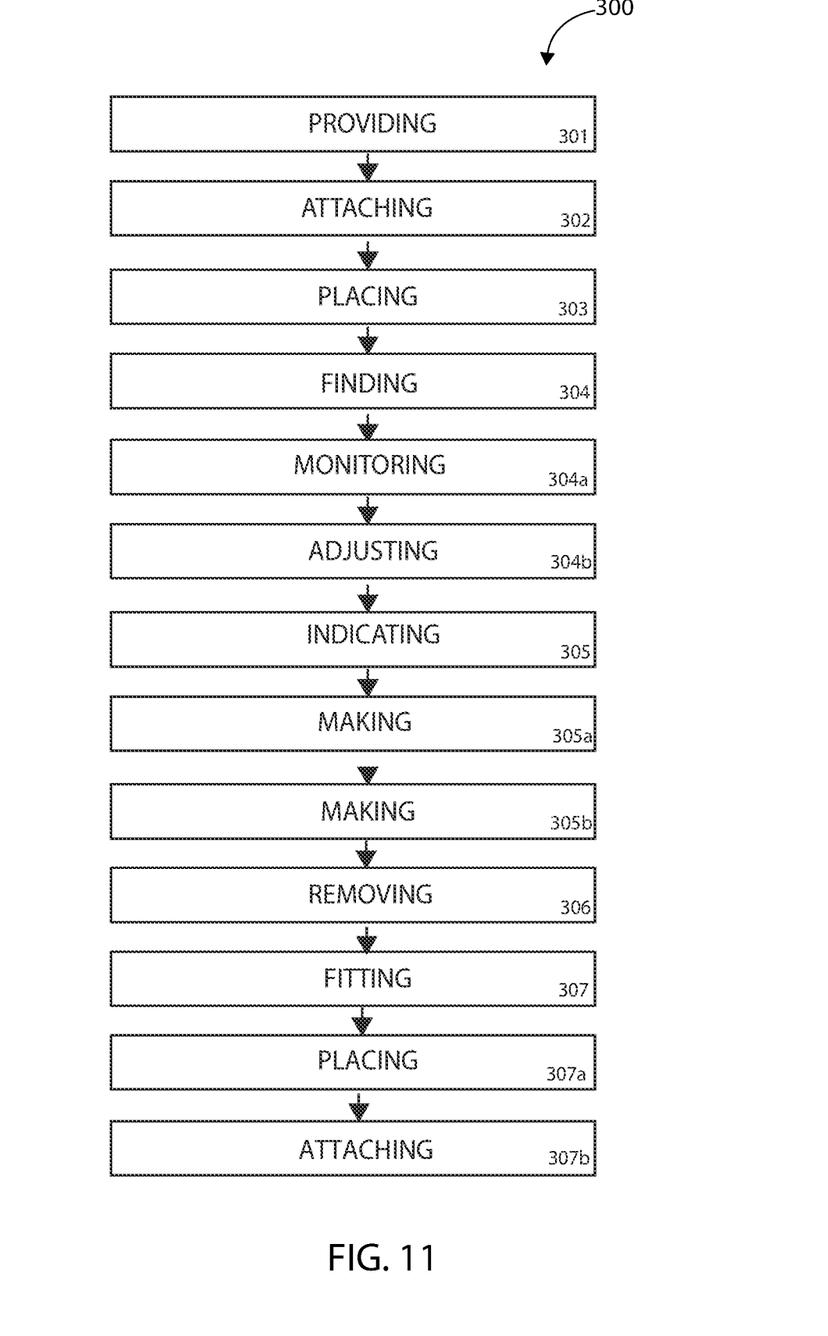
FIG. 11 is another flow diagram illustrating a method of finding and indicating a center of balance of a hoof of a horse and fitting a shoe for the hoof based on the center of balance, according to an embodiment of the present disclosure.

Referring now to FIG. 11 showing a flow diagram illustrating a method 300 of finding and indicating a center of balance of a hoof of a horse and fitting a shoe for the hoof based on the center of balance, according to another embodiment of the present disclosure. The method 300 may include many similar steps as method 200 and may also include one or more components or features of the apparatus 100 as described above. The method 300 may include the steps of: step one 301, providing the apparatus 100 as above; step two 302, attaching the apparatus 100 to the hoof wall 15 of the hoof 10 via the attachment means; step three 303, placing the hoof 10 down on (adjacent) the ground surface, allowing the horse 5 to stand using the hoof; step four 304, finding the center of balance of the hoof 10 by: monitoring (304a) alignment of the hoof 10 and balance of the horse 5; and adjusting (304b) positioning of the apparatus 100 based on monitored alignment and balance until the monitored alignment and balance is correct; step five 305, indicating the center of balance by at least: making (305a) a first mark 142 on the bottom 20 of the hoof 10 underneath the elongated member 120 (again, as shown in FIG. 9B, the first mark 142 may be made partially across a sole and a frog section of the hoof 10); and making (305b) a second mark 144 on the bottom 20 of the hoof 10 at the front body side 117 against the inner perimeter 1101 of the body 110 (again, as shown in FIG. 9B, the second mark 144 may be made partially across a toe section of the hoof); step six 306, removing the apparatus 100 from the hoof wall 15 of the hoof 10 via the attachment means 130; and step seven 307, fitting the horseshoe 25 by at least: placing (307a) a front of a horseshoe toe section 30 against the second mark 144; and attaching (307b) the horseshoe 25 to the hoof wall 15 of the hoof 10 (using suitable attachment methods).

Figure 9A:
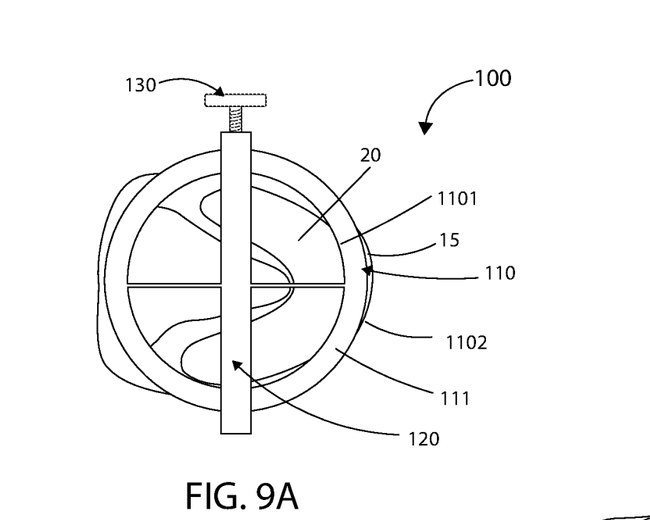
FIG. 9A is a bottom view of the apparatus, illustrating the apparatus being attached to the hoof wall of the hoof, according to an embodiment of the present disclosure.
Figure 9C:
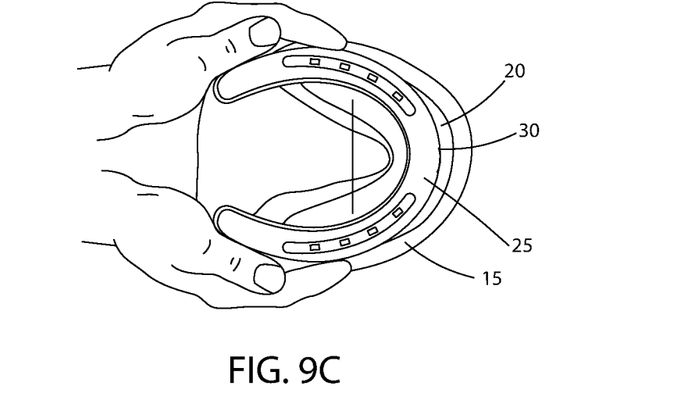
FIG. 9C is a bottom view illustrating a horseshoe being fitted to the hoof wall of the hoof, according to an embodiment of the present disclosure.

Referring specifically to FIGS. 9A-9C, as above, the front member side 121 and the front body side 117 at the inner perimeter 1101 may define the first distance 126 therebetween, and the first distance 126 may measure 2 inches. This measurement may indicate the point of break over of the hoof 10 without having to perform an x-ray. As such, when the center of the balance is found (when the horse 5 is balanced), the marking (305b) of the bottom 20 of the hoof 10 at the front body side 117 against the inner perimeter 1101 of the body and subsequent placing (307a) and attaching (307b) of the horseshoe 25 against the second mark 144 may ensure that the horseshoe 25 maintains proper posture and balance for the horse 5. When the hooves are balanced, a weight bearing surface of the hoof 10 may change, allowing structures inside the hoof to function properly. This may allow the horse 5 to stand the way it was naturally intended and thus grow a healthier and stronger hoof 10.

It should be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for locating a center of balance of a horse hoof are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An apparatus for use in finding a center of balance of a hoof of a horse, the apparatus configured for removable attachment to a hoof wall of the hoof, the apparatus comprising:

a body being defined by a peripheral plate framing an opening, the body further including a top body side opposite a bottom body side, a left body side opposite a right body side and a front body side opposite a rear body side all being relative to the horse when the apparatus is attached to the hoof, the top body side being configured to contact the hoof wall of the hoof, the peripheral plate including an inner perimeter, an outer perimeter and a flat profile such that the body lies flat against the hoof wall of the hoof when attached thereto;

an elongated member attached to the bottom body side of the body at a mid-section thereof, the elongated member including a front member side opposite a rear member side, a left member side opposite a right member side and a length therebetween, the length spanning horizontally from the left body side to the right body side and over the opening, the front member side and the front body side at the inner perimeter defining a first distance therebetween, the rear member side and the rear body side at the inner perimeter defining a second distance therebetween, the elongated member protruding from the bottom side of the body and contacting a ground surface when the apparatus is attached to the hoof, thus elevating the hoof off of the ground surface to cause an imbalance in the hoof when the horse stands using the hoof and the apparatus is not placed in line of the center of balance of the hoof and to cause the hoof to be balanced when the horse stands using the hoof and the apparatus is placed in line of the center of balance of the hoof; and an attachment means located on the apparatus and configured to attach the apparatus to the hoof.

2. The apparatus of claim 1, wherein the peripheral plate includes a ring shape.

3. The apparatus of claim 2, wherein the elongated member is an elongated bar.

4. The apparatus of claim 3, wherein elongated bar has a cylindrical shape.

5. The apparatus of claim 4, wherein the first distance measures 2 inches.

6. The apparatus of claim 1, wherein the attachment means includes an adjustable clamp assembly.

7. The apparatus of claim 6, wherein the elongated member includes a first vertical section at the left member side and a second vertical section at the right member side, wherein the adjustable clamp assembly includes a threaded screw, wherein the second vertical section includes a threaded aperture for receiving the threaded screw, wherein the threaded screw is configured to be selectively threaded into the threaded aperture to tighten the adjustable clamp assembly against the hoof, and wherein the threaded screw is configured to be selectively threaded out of the threaded aperture to loosen the adjustable clamp assembly against the hoof.

* * * * *